United States Patent [19]

Kubo et al.

[11] Patent Number: 4,949,244
[45] Date of Patent: Aug. 14, 1990

[54] STORAGE SYSTEM

[75] Inventors: Kanji Kubo; Akio Yamamoto; Katsumi Takeda, all of Hadano, Japan

[73] Assignee: Hitachi, Ltd., Tokyo, Japan

[21] Appl. No.: 148,859

[22] Filed: Jan. 27, 1988

[30] Foreign Application Priority Data

Feb. 18, 1987 [JP] Japan .................................. 62-35357

[51] Int. Cl.$^5$ ............................................. G06F 12/08
[52] U.S. Cl. ............................. 364/200; 364/239.51; 364/243.41; 364/247.2; 364/247.4; 364/259.2
[58] Field of Search ... 364/200 MS File, 900 MS File

[56] References Cited

U.S. PATENT DOCUMENTS

| | | | |
|---|---|---|---|
| 4,371,929 | 2/1983 | Brann et al. | 364/200 |
| 4,424,561 | 1/1984 | Stanley et al. | 364/200 |
| 4,467,419 | 8/1984 | Wakai | 364/200 |
| 4,618,926 | 10/1986 | Kubo et al. | 364/200 |
| 4,646,737 | 2/1987 | Allen | 364/200 |

Primary Examiner—Thomas M. Heckler
Attorney, Agent, or Firm—Antonelli, Terry, Stout & Kraus

[57] ABSTRACT

In a storage system having a main storage and a buffer storage accessable by a plurality of requesters, the buffer storage comprises a buffer storage data area having a plurality of storage areas for storing a portion of data of the main storage as a copy of the main storage for each predetermined storage unit, and a buffer storage address area for storing addresses of the predetermined storage units corresponding to the storage areas. The buffer storage address area is divided into a plurality of address area banks each interleaved by storage unit, and the buffer storage data area is divided into a plurality of data area banks each interleaved by an access width unit.

17 Claims, 3 Drawing Sheets

STORAGE SYSTEM

BACKGROUND OF THE INVENTION

The present invention relates to a storage system having a buffer storage, and more particularly to a storage system suitable for use when a plurality of requesters simultaneously access the buffer storage.

In a storage system having the buffer storage, the buffer storage is selected to be of smaller capacity and higher speed than a main storage, and a portion of data stored in the main storage which is most frequently used is stored in the buffer storage so that the data can be quickly accessed through the buffer storage. The buffer storage has a data area for storing the data as well as a buffer storage address area. The buffer storage address area stores addresses of the data stored in the data area and indicates whether or not the data at the accessed address is present in the data area.

Where such a buffer storage is directly accessed by a pipelined instruction processor, instruction fetch, operand fetch and operand store requests may be independently issued to the buffer storage and hence those requests may be issued simultaneously. In this case, lower priority instructions are reserved and the execution performance of the instruction processor is lowered. In order to resolve this problem, in U.S. Pat. No. 4,618,926, each of the address area and the data area of the buffer storage is divided into an instruction fetching area and an operand fetching area which are independently accessible, and an address area for only the operand store is provided.

NIKKEI ELECTRONICS, Nov. 18, 1985, pages 241 to 243 discloses a three-hierachy storage system in which an intermediate buffer storage is added between the buffer storage which is directly accessed by the instruction processor and the main storage. Usually, an input/output processor, in addition to the instruction processor, is connected to the intermediate buffer storage. Thus, access requests from those processors may be simultaneously issued. In this case, again, the lower priority access request is reserved.

A multi-processor system is disclosed in NIKKEI ELECTRONICS, Nov. 18, 1985, pages 243 and 244. A plurality of instruction processors and a plurality of input/output processors are connected to an intermediate buffer memory and hence the competition between access requests increases. In order to resolve this problem, it is proposed to provide a plurality of intermediate buffers which are independently operable in order to reduce the competition between access requests.

In those prior art systems, a plurality of buffer storages are provided to improve the system throughput. However, in those systems, the amount of hardware increases and a complex control is required to keep the contents of the plurality of buffer storages consistent.

SUMMARY OF THE INVENTION

It is an object of the present invention to provide a storage control system which minimizes increase of hardware and reduces competition for access in a buffer storage by a relatively simple control.

In order to achieve the above object, in accordance with the present invention, a buffer storage address area is divided into a plurality of banks which are interleaved by a block (a second predetermined storage unit), and a buffer storage data area is also divided into a plurality of banks which are interleaved by an access width (a first predetermined storage unit).

With such an arrangement, when a plurality of access requesters access different banks of the buffer storage address area, the buffer storage accesses by the plurality of access requesters can be simultaneously processed and the throughput is enhanced.

DESCRIPTION OF THE PREFERRED EMBODIMENTS

Figure 1:
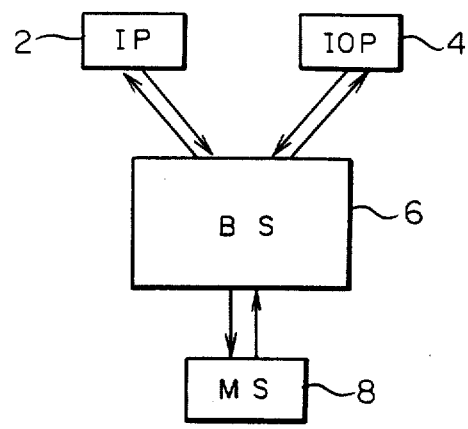
FIG. 1 shows a block diagram of a computer system to which the present invention is to be applied.

Prior to the explanation of the present invention, the configuration of a prior art buffer storage system is explained. FIG. 1 shows a block diagram of a computer system to which the present invention is to be applied. A buffer storage (BS) 6 is connected to a main storage (MS) 8 and to two processors, for example, an instruction processor (IP) 2 and an input/output processor (IOP) 4.

Figure 2:
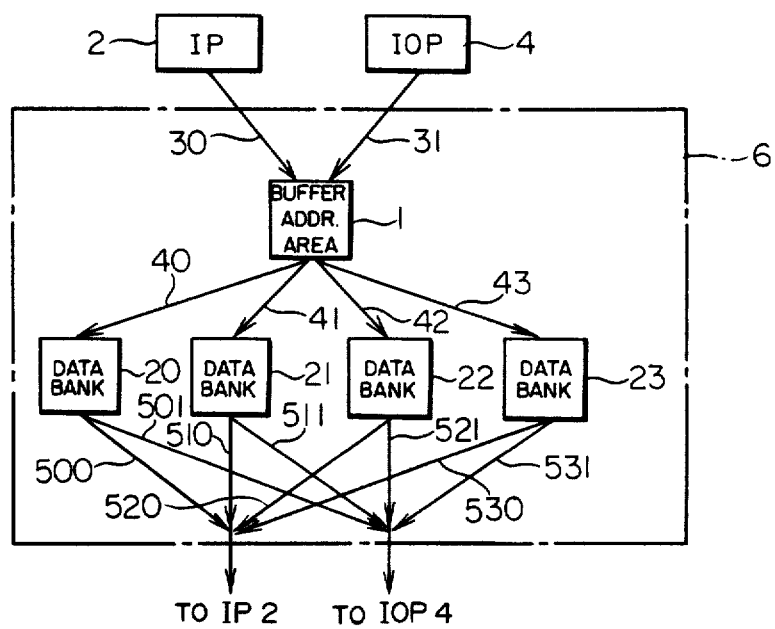
FIG. 2 shows a block diagram of a prior art buffer storage.

FIG. 2 shows a configuration of an address area and a data area of the buffer storage 6 of the prior art system. The buffer storage 6 is connected to two processors 2 and 4.

In FIG. 2, the buffer storage comprises a buffer address area 1 and a data area divided into four banks 20-23. Where an access width to each of the banks 20-23 of the data area is 8 bytes, each bank is interleaved by a first predetermined storage unit, i.e. 8 bytes. The processors 2 and 4 independently request accesses of the address area 1 by a first address line 30 and a second address line 31, respectively. Since the address area 1 can process only one request at one time, if two requests are simultaneously issued, one of them is reserved. The request which refers to the address area 1 selectively accesses the banks 20-23 of the data area via data area address lines 40-43. When data is to be read, if the processor 2 requests the access, data read from the accessed bank is transferred to the processor 2 through data lines 500, 510, 520 and 530, and if the processor 4 requests the access, data read from the accessed bank is transferred to the processor 4 through data lines 501, 511, 521 and 531.

In the prior art system of FIG. 2, when the two processors simultaneously issue access requests, the lower priority request is reserved.

Figure 3:
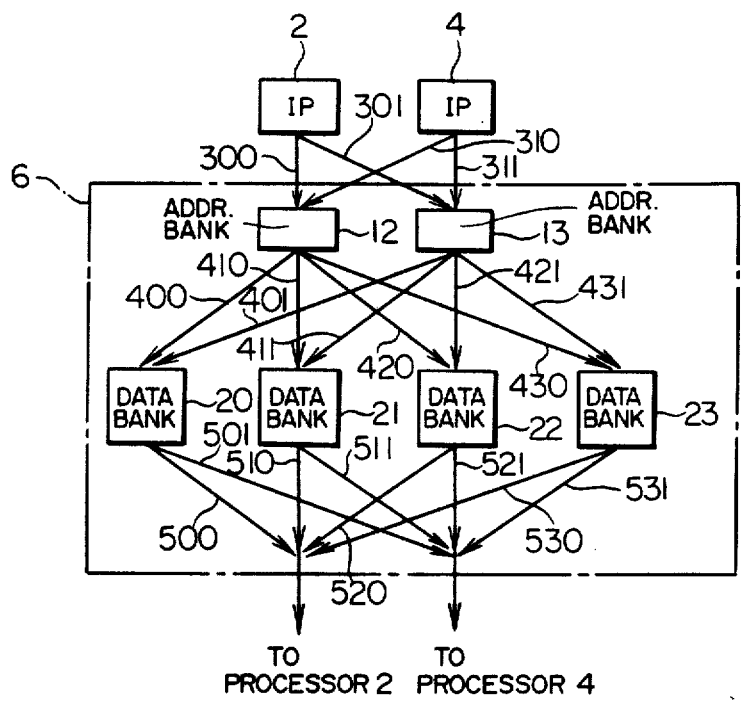
FIG. 3 shows a block diagram of a buffer storage in one embodiment of a storage system of the present invention.

An embodiment of the storage system of the present invention is now explained. FIG. 3 shows a block diagram of a buffer storage in the embodiment in which the present invention is applied to the computer system shown in FIG. 1.

In the present embodiment, the address area 1 of FIG. 2 is divided into a plurality of banks, for example, two banks 12 and 13 and the banks are interleaved by a second predetermined storage unit (block). Assuming that one block consists of 64 bytes, addresses of even numbered blocks are registered in an address area bank 12 while addresses of odd numbered blocks are registered in an address area bank 13. Address lines 300, 301 and 310, 311 of first and second access requesters or processors 2 and 4 are connected to the address area banks 12 and 13. When the address of the first access requester specifies an even-number block, the address area bank 12 is referred to by the address line 300, and when it refers to an odd-number block, the address area bank 13 is referred to by the address line 301. For the second access requester, when the address specifies an odd-number block, the address area bank 12 is referred to by the address line 310, and when it specifies an odd-number block, the address area bank 13 is referred to by the address line 311. Data area addresses generated by referencing the address area banks 12 and 13 are supplied to the data area banks 20-23 by data area address lines 400, 410, 420, 430 and the data area address lines 401, 411, 421, 431. In this manner, different data area banks 20-23 can be simultaneously accessed. Further, one of the data area banks can be selectively accessed by the data area address.

The operations of the data areas 20-23 and the data lines 500, 510, 520, 530, 501, 511, 521 and 531 are same as those in FIG. 2.

In the system of FIG. 3, if the addresses of the first access requester and the second access requester specify different blocks of the address area, the address area banks 12 and 13 can be simultaneously referred to and one of the access requests need not be reserved. Accordingly, the system throughput is improved and the present embodiment is superior to FIG. 2. Further, the amount of hardware of the address area banks 12 and 13 is essentially the same as that of the address area 1 of FIG. 2.

Figure 4:
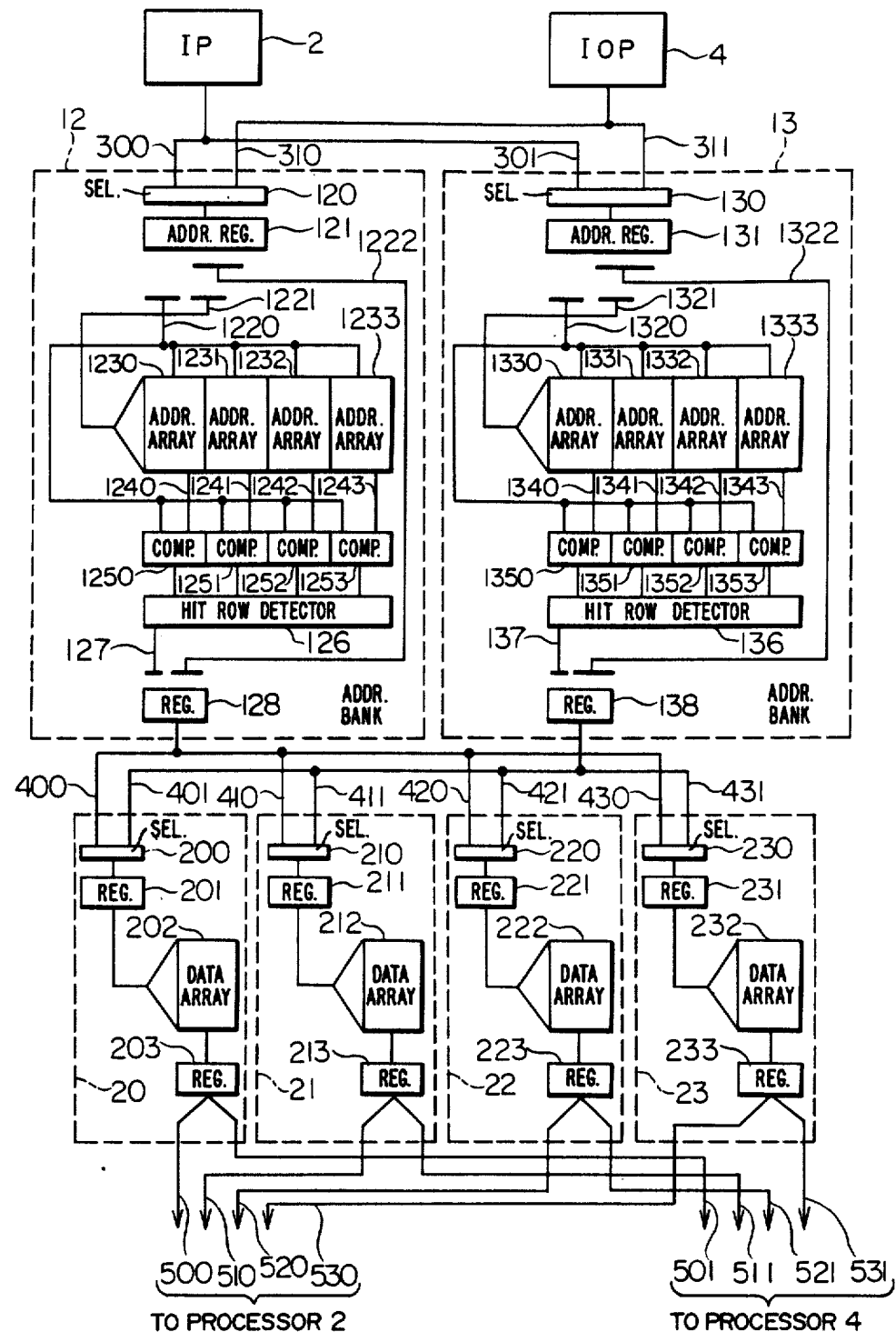
FIG. 4 shows a detailed configuration of the buffer storage of FIG. 3.

Details of the buffer storage address area banks 12 and 13 and the data area banks 20, 21, 22 and 23 of FIG. 3 are shown in FIG. 4.

In FIG. 4, the requester address lines 300, 310, 301 and 311, the address area banks 12 and 13, the data area address lines 400, 410, 420, 430, 401, 411, 421 and 431, the data area banks 20-23, the data lines 500, 510, 520, 530, 501, 511, 521 and 531 are identical to those of FIG. 3.

The address area bank 12 comprises a selector 120, an address register 121, address arrays 1230-1233, comparators 1250-1253, a hit row detector 126 and a data area address register 128. The address array is of four-row structure and the address arrays 1230-1233 correspond to the rows 0-3, respectively. When the addresses on the address lines 300 and 310 of the first and second access requesters specify even-number blocks, the selector 120 selects a higher priority one of the addresses and supplies it to the address register 121. The selection is done by a known priority determination circuit (not shown) which compares the addresses or the address lines 300 and 310, detects the higher priority one and indicates it to the selector 120. The output of the address register 121 is divided into a high order address line 1220 which is connected to rows 1230-1233 of the address array and comparators 1250-1253 for outputs 1240-1243 of the rows, a low order address line 1221 connected to address inputs of the rows 1230-1233 of the address array, and a low order data area address line 1222 connected to the low order of the data area address register 128. The addresses held in the corresponding columns of the rows 1230-1233 of the address array are supplied to the outputs 1240-1243 by the low order address line 1221. The comparators 1250-1253 compare the addresses of the high order address lines 1220 and the addresses supplied from the address array 1230-1233, and when an address specified by the address register 121 is registered in the address array, the row in which it is registered is indicated to the hit row detector 126, which encodes it to generate a row address and supplies it to the high order portion of the data area address register 128 via the row address line 127. The content of the low order data address line 1222 is supplied to the low order portion of the data address register 128 so that the data area address is defined.

The configuration of the address area bank 13 is similar to that of the address area bank 12 and it comprises a selector 130, an address register 131, address arrays 1330-1333, comparators 1350-1353, a hit row detector 136 and a data area address register 138. The address area bank 13 operates independently from the address area bank 12. When addresses on the address lines 301 and 311 of the first and second access requesters specify odd-number blocks, the address area bank 13 examines which ones of the address arrays 1330-1333 the addresses are registered in. If they are registered, the data area address is established in the data area address register 138.

The data area addresses from the address area banks 12 and 13 are supplied to the selectors 200, 210, 220 and 230 of the data area banks 20-23 and used to access the data area banks. For example, in the data area bank 20, when the data area addresses on the data area address lines 400 and 401 from the address area banks 12 and 13 simultaneously specify the bank 20, the selector 200 selects a higher priority address and supplies it to the data area address register 201 to access the data array 202 of the bank 0. The selection of the higher priority address is done by providing in the data area a priority determination circuit similar to that used in the address area.

When the data area addresses from the address area banks 12 and 13 specify different ones of the data area banks 20-23, the data arrays of those banks can be simultaneously accessed.

When data is to be read from the data area, for example, when data is to be read from the data area bank 20, the data read from the data array 202 is supplied to the data register 203 and it is sent to the access requester, that is, the processor 2 or 4 through the data line 500 or 501. The operations of other data area banks 21-23 are similar to that of the data area bank 20.

All data area banks 20-23 may be simultaneously accessed by the addresses from the address area banks 12 and 13 to simultaneously read the 32-byte data.

In the above embodiment, the priority of the address area banks 12 and 13 and the priority of the data area banks 20-23 are separately determined. Alternatively, when the priority of the address area banks 12 and 13 is determined, the priority of the data area banks 20-23 may be taken into account so that the address area banks 12 and 13 are simultaneously activated only when different 8-bytes of data area banks of different access requesters are accessed.

In the above embodiment, there are two access requesters and the address area is divided into two banks (even-number block and odd-number block). However, the present invention is not limited to such an embodiment but m (m≧2) requesters and an address area having n (n≧2) banks may be used.

The access requesters or processors are not limited to IP's or IOP's.

In accordance with the present invention, the address area of the buffer storage is divided into a plurality of banks each of which is interleaved by blocks. Accordingly, even if the blocks specified by the addresses of a plurality of requesters are different, the plurality of address areas may be simultaneously accessed, and the competition between accesses in the bank storage address area can be reduced without increasing the hardware.

We claim:

1. A storage system having a main storage and a buffer storage accessible by a plurality of requesters, said buffer storage comprising:
    address storage means divided into plural address area banks each having plural first blocks for holding addresses, the addresses being allocated to the different address area banks sequentially in a cyclic fashion in the order of the address number and the addresses allocated to each of the address area banks being allocated to said first blocks in its address area bank;
    access request transfer means capable of simultaneously receiving access request from a plurality of said requesters and capable of simultaneously transferring the access request to different address area banks respectively designated by said access requests;
    data storage means for holding a part of data of said main storage which is respectively associated with the addresses in said address storage means as a copy of said main storage, said data storage means being divided in to plural data area banks each having plural second blocks for holding data which is respectively designated by the addresses, the part of data being allocated to the different data area banks sequentially in a cyclic fashion in the order of the address number and the data allocated to each of the data area banks being allocated to said second blocks in its data area bank; and
    address transfer means capable of simultaneously receiving addresses from said plurality of address area banks and capable of simultaneously transferring the received address to the different data area banks respectively designated by the addresses;
    wherein each of said address area banks includes judge means for judging whether an address designated by an access request transferred from said access request transfer means is held in its address area bank or not, and means for supplying the address which is judged as being held in its address area bank by said judge means to said address transfer means; and
    each of said data area banks accesses one of said second blocks designated by an address transferred from said address transfer means.

2. A storage system according to claim 1, wherein the width of data held in each of said second blocks is the same as the width of data transferred between said requesters and each of said data area banks of said buffer storage, and the width of data held in each of said first blocks is different from the width of data held in said second blocks.

3. A storage system according to claim 2, wherein the data width of data held in each of said first blocks is larger than the data width of data held in each of said second blocks.

4. A storage system according to claim 1, wherein the width of data held in each of said second blocks is the same as an access width to said second block, and the width of data held in each of said first blocks is different from the width of data held in said second blocks.

5. A storage system according to claim 1, wherein said access request transfer means includes means for judging whether at least two access request among access requests simultaneously received from said requesters designate the same address area bank or not, and means for selecting one access request having a highest priority among the at least two access requests which are judged as designating the same address area bank and for transferring the selected access request prior to any remaining ones among the at least two access request to the address area bank designated by the selected access request.

6. A storage system according to claim 1, wherein said address transfer means includes means for judging whether at least two addresses among addresses simultaneously received from said address area banks designate the same data area bank or not, and means for selecting one address having a highest priority among the at least two addresses which are judged as designating the same data area bank and for transferring the selected address prior to any remaining ones among the at least two addresses to the data area bank designated by the selected address.

7. A storage system according to claim 1, wherein each of said data area banks includes means for reading out data held in the data area bank and for sending the read-out data to the requester which sent the access request when the access request corresponding to the address supplied thereto indicates a read out operation of data.

8. A storage system according to claim 1, wherein each of said data area banks includes means for writing data therein when the access request corresponding to the address supplied thereto indicates writing of data.

9. A storage system having a main storage and a buffer storage accessible by a plurality of requesters, said buffer storage comprising:
    address storage means divided into plural address area banks each having plural first blocks for holding addresses, the addresses being interleaved to the different address area banks sequentially in the order of the address number and the addresses allocated to each of the address area banks being allocated to said address areas in its address area bank;
    a plurality of first address selection means provided in one-by-one correspondence to said address area banks, each of said first address selection means including means for simultaneously receiving addresses from a plurality of said processors, means for selecting an address designating a corresponding one of said address banks among the received addresses and means for transferring the selected address to the corresponding one of said address area banks;
    data storage means for holding a part of data of said main storage which is respectively associated with the addresses in said address storage means as a copy of said main storage, said data storage means being divided into plural data area banks each having plural data areas for holding data which is respectively designated by the addresses, the data being interleaved to the different data area banks sequentially in the order of the address number and the data allocated to each of the data area banks being allocated to said data areas in its data area bank; and a plurality of second address selection means provided in one-by-one correspondence to said data area banks, each of said plurality of second address selection means including means for receiving plural addresses from said address area banks, means for selecting an address designating a corresponding one of said data area banks among the received addresses and means for transferring the selected address to the corresponding one of said data area banks;

wherein each of said address area banks includes judge means for judging whether an address transferred from corresponding one of said plurality of first address selection means is held in its address area bank or not, and means for supplying the address which is judged as being held in its address area bank by said judge means to said plurality of second address selection means; and each of said data area banks accesses one of said data areas designated by an address transferred from corresponding one of said plurality of second address selection means.

10. A storage system according to claim 9, wherein the width of data held in each of said data areas is the same as the width of data transferred between said processors and each of said data areas of said buffer storage, and the width of data held in each of said address areas is different from the width of data held in said data areas.

11. A storage system according to claim 10, wherein the data width of data held in each of said address areas is larger than the data width of data held in each of said data areas.

12. A storage system according to claim 9, wherein each of said plurality of first selection means includes means for judging whether at least two addresses among addresses simultaneously received from said processors designate the same address area bank or not, and mean for selecting one address having a highest priority among the at least two addresses which are judged as designating the same address area bank and for transferring the selected address prior to any remaining ones among the at least two address to the address area bank designated by the selected address.

13. A storage system according to claim 9, wherein each of said plurality of second selection means includes means for judging whether at least two addresses among addresses simultaneously received from said address area banks designate the same data area bank or not, and means for selecting one address having a highest priority among the at least two addresses which are judged as designating the same data area bank and for transferring the selected address prior to any remaining ones among the at least two addresses to the data area bank designated by the selected address.

14. A storage system according to claim 9, wherein each of said data area banks includes means for reading out data held in the data bank area and for sending the read-out data to the processor which sent the address when the address supplied thereto indicates a read out operation of data.

15. A storage system according to claim 9, wherein the width of data held in each of said data areas is the same as an access width to said data area, and the width of data held in each of said address areas is different from the width of data held in said data areas.

16. A storage system according to claim 9, wherein each of said data areas includes means for writing data therein when the address supplied thereto indicates writing of data.

17. A storage system having a main storage and a buffer storage accessible by a plurality of requesters, said buffer storage comprising:

address storage means divided into plural address area banks for holding addresses, the addresses being allocated to the different address area banks sequentially in a cyclic fashion in the order of the address number;

access request transfer means responsive to receipt of access requests from a plurality of said requesters for simultaneously transferring the access requests to different address area banks respectively designated by the access requests;

data storage means for holding a part of data of said main storage which is respectively associated with the addresses in said address storage means as a copy of said main storage, said data storage means being divided into plural data area banks each for holding data and designated by the addresses, the data being allocated to the different data area banks sequentially in a cyclic fashion in the order of address number; and address transfer means capable of simultaneously receiving addresses from said plurality of address area banks and capable of simultaneously transferring the received addresses to the different data area banks respectively designated by the addresses;

wherein each of said address area banks includes judge means for judging whether an address designated by an access request transferred from said access request transfer means is held in its address area bank or not, and means for supplying the address which is judged as being held in its address area bank by said judge means to said address transfer means; and each of said data area banks accesses data designated by an address transferred from said address transfer means.

* * * * *